INVENTOR.
HYMAN P. MANSBERG

INVENTOR.
HYMAN P. MANSBERG
BY
Darby & Darby
ATTORNEYS

2,751,275

Patented June 19, 1956

2,751,275

CATHODE-RAY OSCILLOGRAPH RECORDING CAMERA

Hyman P. Mansberg, Fairlawn, N. J., assignor to Allen B. Du Mont Laboratories, Inc., Clifton, N. J., a corporation of Delaware Application October 20, 1951, Serial No. 252,360

2 Claims. (Cl. 346—110)

This invention relates to a camera and more specifically to a camera used to record patterns displayed on the screen of a cathode-ray oscillograph.

When recording such patterns it is desirable to be able to observe what is being recorded and it is also desirable to record pertinent data regarding the pattern on the same film or photographic plate at the same time.

It is therefore an object of this invention to provide an improved camera for photographically recording patterns displayed on the screen of a cathode-ray oscillograph.

It is a further object of this invention to provide a camera especially adapted to simultaneously photographically record on the same film the data pertaining to the pattern.

It is a still further object to provide a means of viewing with both eyes the cathode-ray tube trace and the data to be recorded.

It is another object to provide means for recording a plurality of closely spaced patterns on a single film.

Figure 1:
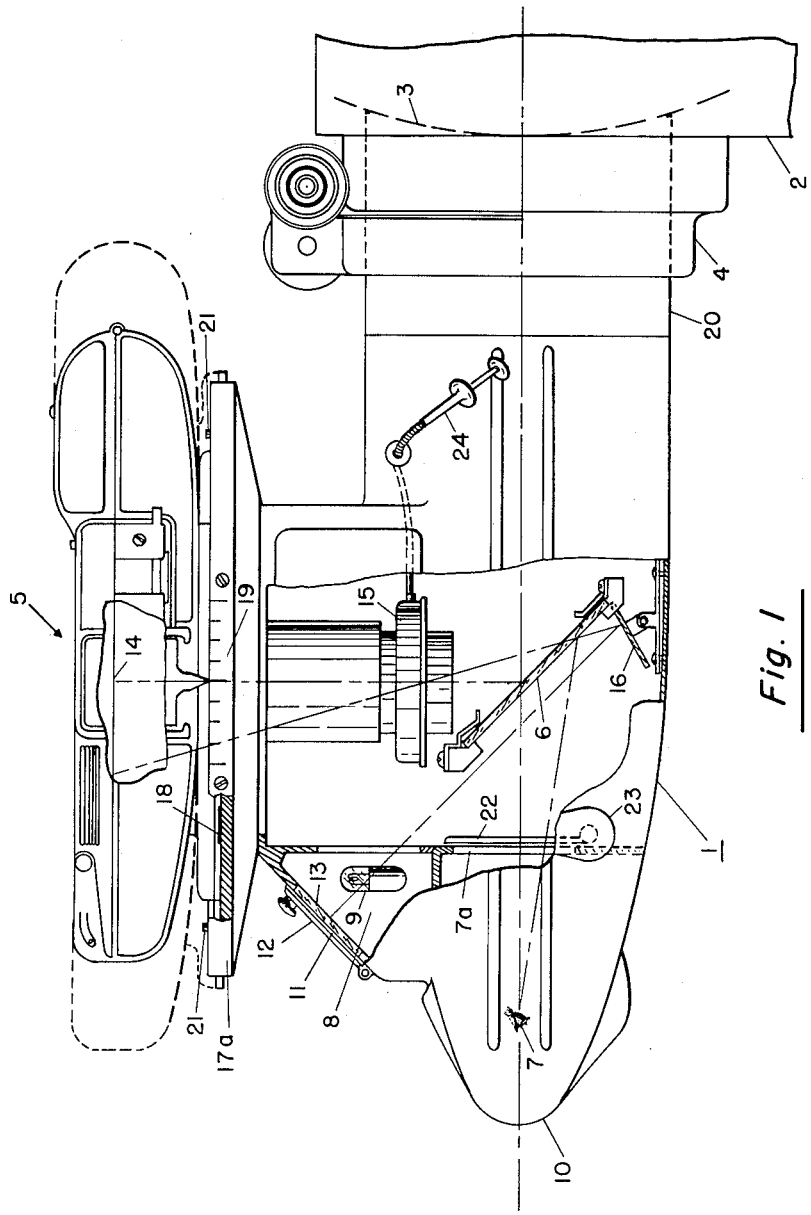
Figure 2:
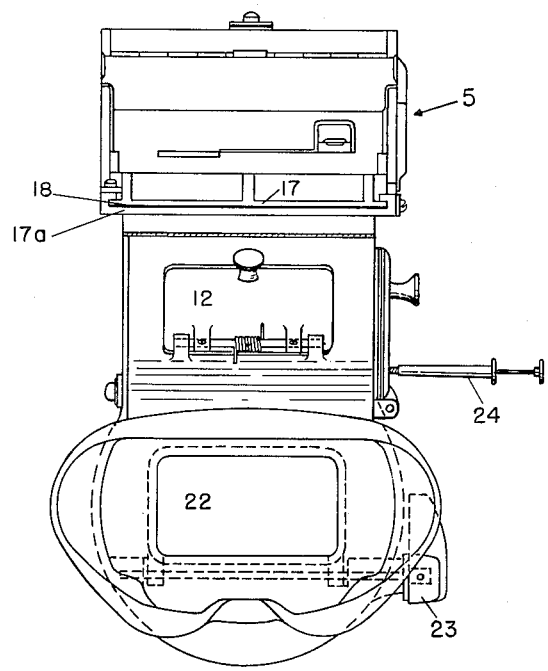

These and other objects will become apparent from a study of the specification in connection with the drawings, in which:

Fig. 1 is an elevational view, partly in cross-section, of a recording camera embodying the present invention and utilizing a quick-processing type of camera-back, and Fig. 2 is an end view of the recording camera illustrated in Fig. 1.

Referring to Fig. 1, there is shown a housing 1 provided with a mounting clamp 4 adapted for attaching the housing on the front of a cathode-ray oscillograph 2 in such a position that the face of the cathode-ray tube 3 is included within the mounting clamp.

On top of the housing is mounted a camera-back 5 of the quick-processing type such as the well known Polaroid-Land camera.

Directly beneath the camera-back 5, and mounted within the housing at an angle of 45° with respect to the focal axis of the camera is a dichroic, or interference type mirror 6. The reflectance characteristic of this mirror is such that a high percentage of the photographically effective light (actinic light) from the cathode-ray tube 3 is reflected upward to the camera-back 5. Visually useful light in the yellow region is transmitted through the mirror to the eyes 7 of an observer.

A chamber 8 in the housing contains a pair of small lamps 9 only one of which is shown for illuminating a white matte surface 11 mounted upon a hinged panel 12. An opening in the housing communicating with this chamber contains a ground glass 13 for diffusing the light from the lamps. When the panel is in the closed position, the white matte surface is in contact with the ground glass. Data to be recorded may be written on the white matte surface of the panel 12 or directly on the surface of the ground glass 13, depending on whether the camera used is one which provides a negative or a finished print such as the "Polaroid-Land camera." Due to the inclusion of mirror 16 in the optical path and the effect of the hinged panel 12, data written on this panel would appear as a mirror image on the final positive print, whereas when written on the ground glass 13, the final image appears correctly. When a standard film material is used, which yields a negative, the data may then be written on the hinged panel, whereby both data and recorded trace from the face of the cathode ray tube are similarly reversed and subsequent viewing of the recording through the emulsion side of the film corrects for both reversals.

In the closed position of the panel, the white matte surface and ground glass surface are arranged to be at a 45° angle with respect to the longitudinal center line of the housing. The lens 15 is normally set so that the mirror 6 image of the cathode-ray tube screen 3 is in focus on the focal plane 14 of the camera-back. The barrel portion 20 of the housing which slips into the mounting clamp 4 has affixed to the end a ring of soft, resilient rubber which is pushed firmly against the face of the cathode-ray tube. This makes it possible to change the recording camera from one oscillograph to another without the necessity of any adjustment of the lens 15. As shown in Figure 1, a small reflecting mirror 16 of conventional, preferably the so-called first surface type is adjustably secured to the housing 1 adjacent the dichroic mirror 6 and on the side of the dichroic mirror opposite the lens 15 so as to receive light directly from the matte surface 11 and ground glass window 13. The reflecting surface of mirror 16 is angularly displaced with respect to mirror 6 so that light received directly from the matte surface 11 and ground glass window 13 is incident on the side of the mirror 6 opposite the lens. With such an arrangement of the mirrors 6 and 16 respectively, light received from the matte surface 11 and ground glass window 13 by mirror 16 is reflected therefrom and is incident on the dichroic mirror 6 on the side thereof opposite the lens. A portion of the light passes through the mirror 6 continuing through lens 15 to a light sensitive recording material in the focal plane of the camera back and another portion is reflected from the mirror 6 to the eye 7 of an observer. Further, mirror 16 being adjustable with respect to the housing and fixed mirror 6, light rays received from the matte surface 11 and ground glass window 13 by the mirror 16 and reflected therefrom may be angularly shifted with respect to the focal axis of lens 15 to cause the reflected light rays to be incident upon the light sensitive recording material either above or below the recorded pattern appearing on the cathode-ray tube screen. The paths of the light beams above described are further illustrated by the broken lines of Figure 1.

The camera-back 5 has mounted thereon a machined shoe 17 (see Fig. 2) which is slideably engaged in a grooved plate 17a attached to the housing. This permits the camera-back to be adjusted with respect to the focal axis for locating the image produced by the optical system at any desired point in the focal plane. Since the photographic plate to be exposed is in the focal plane, by sliding the camera-back by small increments transversely to the direction of the trace to be recorded at right angles to the direction of the image of the trace to be recorded, a series of closely spaced images may be recorded on the same photographic plate which, in the case of the quick processing type mentioned above, is not moved until it is removed from the camera, at which time it is simultaneously developed and fixed. The only portion of the photographic plate exposed to any light at any exposure, is that represented by a particular trace on the screen of the cathode ray tube because the entire optical path is through a light tight enclosure. The sliding mechanism is kept light-tight by means of resilient strips of material 18 such as velvet which are interposed between shoe 17 and plate 17a on opposite sides of the focal axis and extending transversely between the grooved edges of the grooved plate 17a. Resetting of any position is facilitated by a calibrated scale 19. A stop 21 is provided at each end of the grooved section to engage an abutting portion of the shoe 17 thereby preventing the camera-back from being accidentally pulled completely out of the grooved section.

The pattern appearing on the screen 3 and any data provided at the window 13 are observed visually through an opening 7a in the viewing end of the housing, by opening a viewing door 22 which is pivotally supported within the housing and is operated by means of the lever knob 23. When not observing the pattern, the viewing door is closed by means of a biasing spring, not shown. The viewing end of the housing is equipped with a hood 10 of pliable soft rubber, shaped to fit the average contour of the human face against which the operator places his face for each observation. This ensures that his eyes are always reasonably close to the same point indicated as 7 in Fig. 1, to avoid errors in observation due to parallax.

When an exposure is to be made, the shutter is opened by means of the shutter operating cable 24.

While I have illustrated my invention as being particularly adapted for use with a quick processing type of camera-back such as the Polaroid-Land type, it will be obvious that it is equally well adapted for use with the standard roll-film types of camera-backs by suitable modification for securing such camera-backs to the housing.

What is claimed is:

1. Apparatus for recording cathode ray oscillograph representations comprising a housing adapted for attachment to said oscillograph in front of the screen of the cathode ray tube thereof, a camera having a lens and a camera-back containing photographic film to be exposed, said camera-back being slideably mounted on said housing for adjustment to a plurality of predetermined fixed positions to provide a plurality of closely spaced images on a single plate of said photographic film contained therein, said housing having a viewing opening therein, a dichroic mirror positioned within said housing to selectively reflect and pass light from said tube to said camera lens and to said viewing opening, a data registering panel mounted within a further opening in said housing and a data mirror positioned within said housing in the path of light from said panel and at an angle to reflect light from said panel to said camera lens and to said viewing opening.

2. Apparatus for recording cathode ray oscillograph representations comprising a housing adapted for attachment to said oscillograph in front of the screen of the cathode ray tube thereof, said housing having a viewing opening therein, a camera having a lens and a camera-back containing photographic film to be exposed, said camera-back being slideably mounted on said housing for adjustment to a plurality of predetermined positions to provide a plurality of closely spaced images on a single plate of said photographic film contained therein.

References Cited in the file of this patent

UNITED STATES PATENTS

| | | |
|---|---|---|
| 1,826,664 | Hopkins | Oct. 6, 1931 |
| 2,159,969 | Furst | May 30, 1939 |
| 2,483,147 | Mol | Sept. 27, 1949 |
| 2,508,562 | Bonner | May 23, 1950 |
| 2,537,040 | Doyle et al. | Jan. 9, 1951 |
| 2,633,403 | Spaulding | Mar. 31, 1953 |
| 2,680,055 | Hayward et al. | June 1, 1954 |